United States Patent
Ball et al.

(10) Patent No.: US 11,403,058 B2
(45) Date of Patent: Aug. 2, 2022

(54) AUGMENTED REALITY VISION SYSTEM FOR VEHICULAR CREW RESOURCE MANAGEMENT

(71) Applicant: HONEYWELL INTERNATIONAL INC., Morris Plains, NJ (US)

(72) Inventors: Jerry D. Ball, Litchfield Park, AZ (US); Jayasenthilnathan B., Phoenix, AZ (US); Kenneth Leiphon, Phoenix, AZ (US); John Suddreth, Cave Creek, AZ (US)

(73) Assignee: HONEYWELL INTERNATIONAL, INC., Charlotte, NC (US)

( * ) Notice: Subject to any disclaimer, the term of this patent is extended or adjusted under 35 U.S.C. 154(b) by 0 days.

(21) Appl. No.: 16/876,386

(22) Filed: May 18, 2020

(65) Prior Publication Data
US 2021/0357168 A1 Nov. 18, 2021

(51) Int. Cl.
*G06F 3/14* (2006.01)
(52) U.S. Cl.
CPC .................. *G06F 3/1423* (2013.01)
(58) Field of Classification Search
None
See application file for complete search history.

(56) References Cited

U.S. PATENT DOCUMENTS

| 5,015,188 A | 5/1991 | Pellosie, Jr. et al. |
| 8,619,005 B2 | 12/2013 | Cok et al. |
| 8,633,913 B1 * | 1/2014 | Raghu .................. G08G 5/0021 |
| | | 345/173 |
| 9,175,978 B2 | 11/2015 | Hall |
| 9,366,862 B2 | 6/2016 | Haddick et al. |
| 9,561,724 B1 * | 2/2017 | Chen ........................ G06F 3/147 |
| 10,382,746 B1 * | 8/2019 | Shapiro ................... G06F 3/011 |
| 10,761,676 B1 * | 9/2020 | Gilbert ..................... G09G 5/14 |
| 2010/0001928 A1 | 1/2010 | Nutaro |
| 2010/0161339 A1 * | 6/2010 | De Mers ................. G10L 15/22 |
| | | 704/275 |
| 2010/0207843 A1 | 8/2010 | Coloma et al. |
| | (Continued) | |

FOREIGN PATENT DOCUMENTS

EP 2541211 A2 1/2013

OTHER PUBLICATIONS

Experimental Aircraft Info, 'Glass Cockpits, EFIS Displays', [online], [retrieved May 3, 2021], https://web.archive.org/web/20160622111608/https://www.experimentalaircraft.info/homebuilt-aircraft/avionics-efis-systems-displays.php. (Year: 2016).*

(Continued)

*Primary Examiner* — Patrick F Valdez
(74) *Attorney, Agent, or Firm* — Lorenz & Kopf, LLP (57) ABSTRACT

Systems and Methods are provided for displaying flight data parameters to aircrew members of an aircraft. The system includes a first display for a pilot flying (PF) that shows computer generated images of flight data parameters that are designated for the PF. A second display is used for a pilot monitoring (PM) that shows computer generated images of flight data parameters that are designated for the PM. An augmented reality vision system (ARVS) re-assigns the displays of designated computer generated images of flight data parameters between the first display and the second display according to instructions by the PF or the PM.

15 Claims, 5 Drawing Sheets

(56) References Cited

U.S. PATENT DOCUMENTS

2015/0338237 A1 11/2015 Bonamy et al.
2017/0307402 A1* 10/2017 Cherepinsky ........... G06T 17/20
2018/0105284 A1* 4/2018 B. ............................ G01S 7/51

OTHER PUBLICATIONS

Kuhn, Darl, "Head Worn Display for use in Flight Deck Emergency Situations ED", ip.com, ip.com Inc., West Henrietta, NY,Mar. 4, 2014 (Mar. 4, 2014), XP013161785, ISSN: 1533-0001.

* cited by examiner

AUGMENTED REALITY VISION SYSTEM FOR VEHICULAR CREW RESOURCE MANAGEMENT

TECHNICAL FIELD

The present invention generally relates to aircraft avionics, and more particularly relates to an augmented reality vision system for vehicular crew resource management.

BACKGROUND

Aviation crew resource management (CRM) has been a critical component to the history of aviation safety. Currently, CRM is executed between a crew using verbal cues to improve upon the operation safety and flow of the cockpit. As aircraft continually bring increased technological advances into the cockpit, pilots are increasingly being asked to do more. Providing augmentation to the crew will not only enhance the normal CRM practice but it potentially will reduce workload, task loading and memory retention of tasks executed during normal, off-nominal and emergencies situations. Consequently, there is a need to enhance operation efficiency by augmenting the end to end flight tasks associated with pilot operations.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A system is provided for displaying flight data parameters to aircrew members of an aircraft. The system comprises: a first display for a pilot flying (PF) that shows computer generated images of flight data parameters that are designated for the PF; a second display for a pilot monitoring (PM) that shows computer generated images of flight data parameters that are designated for the PM; and an augmented reality vision system (ARVS) that re-assigns the displays of designated computer generated images of flight data parameters between the first display and the second display according to instructions by the PF or the PM.

A system is provided for displaying data parameters to crew members of a vehicle. The system comprises: a primary display for a primary operator of the vehicle that shows computer generated images of data parameters of the vehicle that are designated for the primary operator; a secondary display for a support crew member of the vehicle that shows computer generated images of data parameters of the vehicle that are designated for the support crew member; and an augmented reality vision system (ARVS) that re-assigns the displays of designated computer generated images of data parameters of the vehicle between the primary display and the secondary display according to instructions by the primary operator or the support crew member.

A system is provided for displaying flight data parameters to a pilot of an aircraft. The system comprises: a display for the pilot of the aircraft that shows computer generated images of a set of primary flight data parameters that are designated for the pilot; a secondary set of computer generated images of alternative flight data parameters that are designated for the pilot of the aircraft; and an augmented reality vision system (ARVS) that re-assigns the display of the computer generated images of the primary flight data parameters and the alternative flight data parameters on the display according to instructions by the pilot.

Furthermore, other desirable features and characteristics of the method and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

A system has been developed for displaying flight data parameters to aircrew members of an aircraft. The system includes a first display for a pilot flying (PF) that shows computer generated images of flight data parameters that are designated for the PF. A second display is used for a pilot monitoring (PM) that shows computer generated images of flight data parameters that are designated for the PM. An augmented reality vision system (ARVS) re-assigns the displays of designated computer generated images of flight data parameters between the first display and the second display according to instructions by the PF or the PM.

Figure 1:
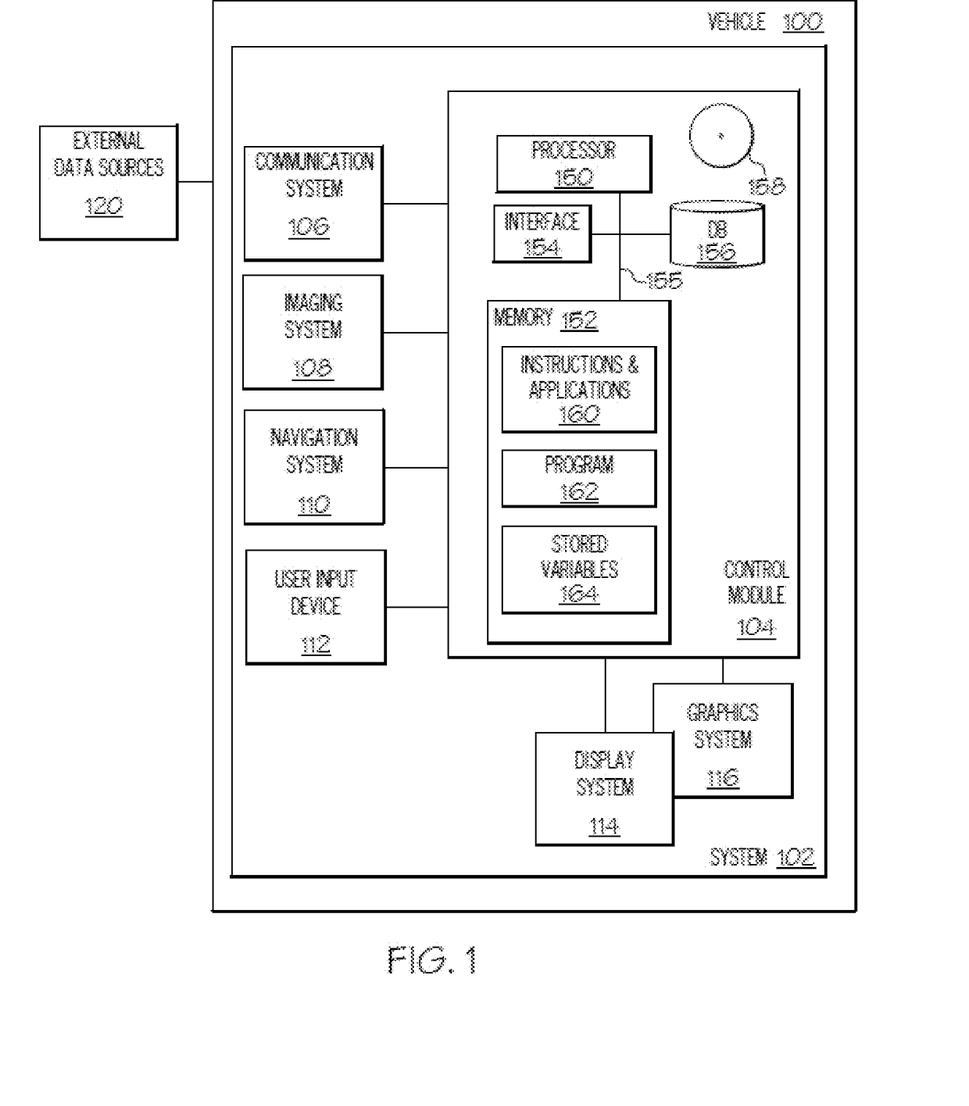
FIG. 1 is a block diagram of a vehicle system according to an exemplary embodiment.

Turning now to FIG. 1, a functional block diagram of a vehicle 100 including a vehicle system 102 for adjusting the Field Of View (FOV) of a sensor based image on an enhanced flight vision system (shortened herein to "enhanced vision system for an aircraft" or "vehicle system" 102) is depicted, in accordance with various exemplary embodiments. In the depicted embodiment, the vehicle system 102 includes: the control module 104 that is operationally coupled to a communication system 106, an imaging system 108, a navigation system 110, a user input device 112, a display system 114, and a graphics system 116. The operation of these functional blocks is described in more detail below. In the described embodiments, the depicted vehicle system 102 is generally realized as an aircraft flight deck display system within a vehicle 100 that is an aircraft; however, the concepts presented here can be deployed in a variety of mobile platforms, such as land vehicles, spacecraft, watercraft, and the like. Accordingly, in various embodiments, the vehicle system 102 may be associated with or form part of larger aircraft management system, such as a flight management system (FMS).

In the illustrated embodiment, the control module 104 is coupled to the communications system 106, which is configured to support communications between external data source(s) 120 and the aircraft. External source(s) 120 may comprise air traffic control (ATC), or other suitable command centers and ground locations. Data received from the external source(s) 120 includes the instantaneous, or current, visibility report associated with a target landing location or identified runway. In this regard, the communications system 106 may be realized using a radio communication system or another suitable data link system.

The imaging system 108 is configured to use sensing devices to generate video or still images, and provide image data therefrom. The imaging system 108 may comprise one or more sensing devices, such as cameras, each with an associated sensing method. Accordingly, the video or still images generated by the imaging system 108 may be referred to herein as generated images, sensor images, or sensed images, and the image data may be referred to as sensed data. In an embodiment, the imaging system 108 comprises an infrared ("IR") based video camera, low-light TV camera, or a millimeter wave (MMW) video camera. The IR camera senses infrared radiation to create an image in a manner that is similar to an optical camera sensing visible light to create an image. In another embodiment, the imaging system 108 comprises a radar based video camera system. Radar based systems emit pulses of electromagnetic radiation and listen for, or sense, associated return echoes. The radar system may generate an image or video based upon the sensed echoes. In another embodiment, the imaging system 108 may comprise a sonar system. The imaging system 108 uses methods other than visible light to generate images, and the sensing devices within the imaging system 108 are much more sensitive than a human eye. Consequently, the generated images may comprise objects, such as mountains, buildings, or ground objects, that a pilot might not otherwise see due to low visibility conditions.

In various embodiments, the imaging system 108 may be mounted in or near the nose of the aircraft (vehicle 100) and calibrated to align an imaging region with a viewing region of a primary flight display (PFD) or a Head Up display (HUD) rendered on the display system 114. For example, the imaging system 108 may be configured so that a geometric center of its field of view (FOV) is aligned with or otherwise corresponds to the geometric center of the viewing region on the display system 114. In this regard, the imaging system 108 may be oriented or otherwise directed substantially parallel to an anticipated line-of-sight for a pilot and/or crew member in the cockpit of the aircraft to effectively capture a forward looking cockpit view in the respective displayed image. In some embodiments, the displayed images on the display system 114 are three dimensional, and the imaging system 108 generates a synthetic perspective view of terrain in front of the aircraft. The synthetic perspective view of terrain in front of the aircraft is generated to match the direct out-the-window view of a crew member, and may be based on the current position, attitude, and pointing information received from a navigation system 110, or other aircraft and/or flight management systems.

Navigation system 110 is configured to provide real-time navigational data and/or information regarding operation of the aircraft. The navigation system 110 may be realized as a global positioning system (GPS), inertial reference system (IRS), or a radio-based navigation system (e.g., VHF omnidirectional radio range (VOR) or long range aid to navigation (LORAN)), and may include one or more navigational radios or other sensors suitably configured to support operation of the navigation system 110, as will be appreciated in the art. The navigation system 110 is capable of obtaining and/or determining the current or instantaneous position and location information of the aircraft (e.g., the current latitude and longitude) and the current altitude or above ground level for the aircraft. Additionally, in an exemplary embodiment, the navigation system 110 includes inertial reference sensors capable of obtaining or otherwise determining the attitude or orientation (e.g., the pitch, roll, and yaw, heading) of the aircraft relative to earth.

The user input device 112 is coupled to the control module 104, and the user input device 112 and the control module 104 are cooperatively configured to allow a user (e.g., a pilot, co-pilot, or crew member) to interact with the display system 114 and/or other elements of the vehicle system 102 in a conventional manner. The user input device 112 may include any one, or combination, of various known user input device devices including, but not limited to: a touch sensitive screen; a cursor control device (CCD) (not shown), such as a mouse, a trackball, or joystick; a keyboard; one or more buttons, switches, or knobs; a voice input system; and a gesture recognition system. In embodiments using a touch sensitive screen, the user input device 112 may be integrated with a display device. Non-limiting examples of uses for the user input device 112 include: entering values for stored variables 164, loading or updating instructions and applications 160, and loading and updating the contents of the database 156, each described in more detail below.

The generated images from the imaging system 108 are provided to the control module 104 in the form of image data. The control module 104 is configured to receive the image data and convert and render the image data into display commands that command and control the renderings of the display system 114. This conversion and rendering may be performed, at least in part, by the graphics system 116. In some embodiments, the graphics system 116 may be integrated within the control module 104; in other embodiments, the graphics system 116 may be integrated within the display system 114. Regardless of the state of integration of these subsystems, responsive to receiving display commands from the control module 104, the display system 114 displays, renders, or otherwise conveys one or more graphical representations or displayed images based on the image data (i.e., sensor based images) and associated with operation of the vehicle 100, as described in greater detail below. In various embodiments, images displayed on the display system 114 may also be responsive to processed user input that was received via a user input device 112.

In general, the display system 114 may include any device or apparatus suitable for displaying flight information or other data associated with operation of the aircraft in a format viewable by a user. Display methods include various types of computer generated symbols, text, and graphic information representing, for example, pitch, heading, flight path, airspeed, altitude, runway information, waypoints, targets, obstacle, terrain, and required navigation performance (RNP) data in an integrated, multi-color or monochrome form. In practice, the display system 114 may be part of, or include, a primary flight display (PFD) system, a panel-mounted head down display (HDD), a head up display (HUD), or a head mounted display system, such as a "near to eye display" system. The display system 114 may comprise display devices that provide three dimensional or two dimensional images, and may provide synthetic vision imaging. Non-limiting examples of such display devices include cathode ray tube (CRT) displays, and flat panel displays such as LCD (liquid crystal displays) and TFT (thin film transistor) displays. Accordingly, each display device responds to a communication protocol that is either two-dimensional or three, and may support the overlay of text, alphanumeric information, or visual symbology.

As mentioned, the control module 104 performs the functions of the vehicle system 102. With continued reference to FIG. 1, within the control module 104, the processor 150 and the memory 152 (having therein the program 162) form a novel processing engine that performs the described processing activities in accordance with the program 162, as is described in more detail below. The control module 104 generates display signals that command and control the display system 114. In particular, the control module 104 determines the FOV dimensions of the sensor image to display on the PFD, and commands and controls the display system 114 accordingly. Upon receiving the display commands, and responsive thereto, the display system 114 renders respective sensor based "displayed images" having the FOV described herein. The control module 104 provides a technological improvement over conventional EFVS methods and display systems by modifying the FOV of a sensor based image responsive to a current visibility report.

The control module 104 includes an interface 154, communicatively coupled to the processor 150 and memory 152 (via a bus 155), database 156, and an optional storage disk 158. In various embodiments, the control module 104 performs actions and other functions in accordance with steps of a method 400 described in connection with FIG. 4. The processor 150 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals.

The memory 152, the database 156, or a disk 158 maintain data bits and may be utilized by the processor 150 as both storage and a scratch pad. The memory locations where data bits are maintained are physical locations that have particular electrical, magnetic, optical, or organic properties corresponding to the data bits. The memory 152 can be any type of suitable computer readable storage medium. For example, the memory 152 may include various types of dynamic random access memory (DRAM) such as SDRAM, the various types of static RAM (SRAM), and the various types of non-volatile memory (PROM, EPROM, and flash). In certain examples, the memory 152 is located on and/or co-located on the same computer chip as the processor 150. In the depicted embodiment, the memory 152 stores the above-referenced instructions and applications 160 along with one or more configurable variables in stored variables 164. The database 156 and the disk 158 are computer readable storage media in the form of any suitable type of storage apparatus, including direct access storage devices such as hard disk drives, flash systems, floppy disk drives and optical disk drives. The database may include an airport database (comprising airport features) and a terrain database (comprising terrain features). In combination, the features from the airport database and the terrain database are referred to map features. Information in the database 156 may be organized and/or imported from an external source 120 during an initialization step of a process (see initialization 402 FIG. 4).

The bus 155 serves to transmit programs, data, status and other information or signals between the various components of the control module 104. The bus 155 can be any suitable physical or logical means of connecting computer systems and components. This includes, but is not limited to, direct hard-wired connections, fiber optics, infrared and wireless bus technologies.

The interface 154 enables communications within the control module 104, can include one or more network interfaces to communicate with other systems or components, and can be implemented using any suitable method and apparatus. For example, the interface 154 enables communication from a system driver and/or another computer system. In one embodiment, the interface 154 obtains data from external data source(s) 120 directly. The interface 154 may also include one or more network interfaces to communicate with technicians, and/or one or more storage interfaces to connect to storage apparatuses, such as the database 156.

It will be appreciated that the vehicle system 102 may differ from the embodiment depicted in FIG. 1. As mentioned, the vehicle system 102 can be integrated with an existing flight management system (FMS) or aircraft flight deck display.

During operation, the processor 150 loads and executes one or more programs, algorithms and rules embodied as instructions and applications 160 contained within the memory 152 and, as such, controls the general operation of the control module 104 as well as the vehicle system 102. In executing the process described herein, such as the method 400 of FIG. 4, the processor 150 specifically loads and executes the novel program 162. Additionally, the processor 150 is configured to process received inputs (any combination of input from the communication system 106, the imaging system 108, the navigation system 110, and user input provided via user input device 112), reference the database 156 in accordance with the program 162, and generate display commands that command and control the display system 114 based thereon.

A target landing location, or runway, may have been part of a flight plan that was received by the control module 104 prior to flight, may be received during flight, or may be decided during flight. Regardless of its source, during an approach and landing operation of an aircraft, the control module 104 determines or identifies the target landing location, such as an airport runway. Although especially relevant during an approach and landing operation, the processor 150 is configured to receive a current visibility report associated with the target landing location from an external data source 120. For example, a current airport visibility report, containing airport visibility information, may be obtained through voice or electronic automatic terminal information service (ATIS) broadcasting. The ATIS report, also referred to herein as the visibility report, may include a weather report, and may include a variety of other cause and quantification information about conditions that affect visibility at the target landing location. In a first example, a visibility report indicates that smog is currently inhibiting visibility at the target landing location. In a second example, there may be smog and fog affecting visibility at the target landing location. Other examples may include inhibited visibility due to blowing dust, blowing snow, or chemical gasses. The novel control module 104 includes rules and predetermined thresholds defining "low visibility"

for a plurality of such scenarios that affect visibility. In some scenarios, a pilot or user may utilize user input device 112 to set low visibility conditions, in accordance with according ATIS and/or other weather reports. Based on the rules and thresholds, and user input, the control module 104 processes the received visibility report and determines the visibility at the target landing location. Specifically, the control module 104 determines when respective low visibility conditions are currently underway at the target landing location.

Figure 2:
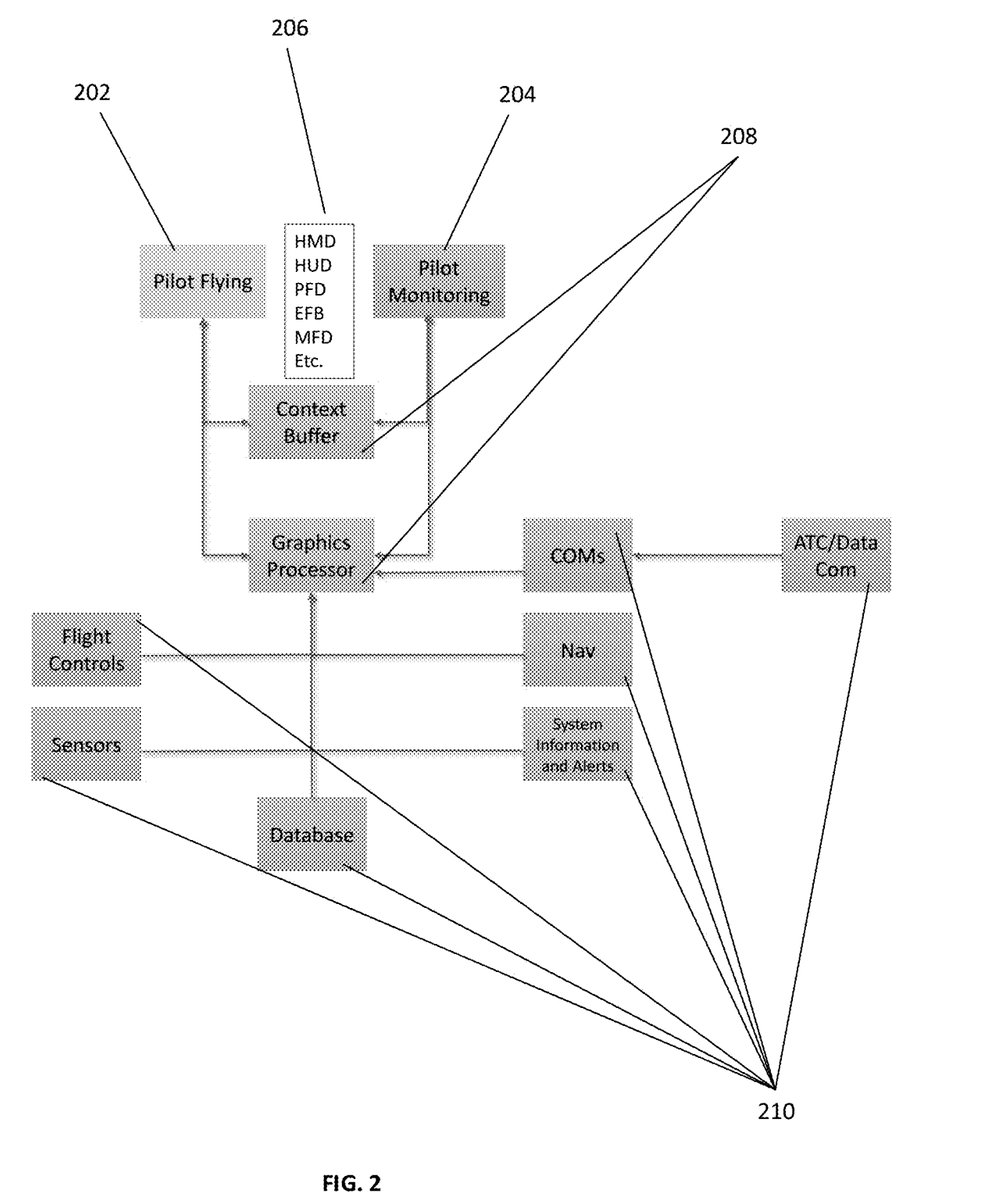
FIG. 2 is a block diagram of an augmented reality vision system (ARVS) according to an exemplary embodiment.

Turning now to FIG. 2, a block diagram 200 of an augmented reality vision system (ARVS) for an aircraft is shown according to one embodiment. The aircraft includes 2 air crew members: a pilot flying (PF) 202; and a pilot monitoring (PM) 204. Other embodiments may only utilize a single pilot with one display. The PF 202 and the PM 204 each have a separate display that shows different computer-generated images of flight data parameters that are specifically designated for their individual respective use. The displays correspond to the display system 114 shown previously in FIG. 1. The displays for the PF 202 and the PM 204 are controlled by a graphics system that includes a graphics processor and a context buffer 208. This corresponds to the graphics system 116 shown previously in FIG. 1. In various embodiments, the types of display devices 206 may include: a head mounted device (HMD); a head up display (HUD); a head down display (HDD); a primary flight display (PFD); an electronic flight bag (EFB); a multifunction display (MFD); etc. The flight data parameters shown on the displays 206 may come from various data sources 210 such as: flight controls; sensors on board the aircraft; a database located on the aircraft; system information and alerts generated by the systems on board the aircraft; a navigation system on board the aircraft; etc. Also included as a source of flight data parameters 210 is a communication system that receives data communications from air traffic control (ATC).

Figure 3:
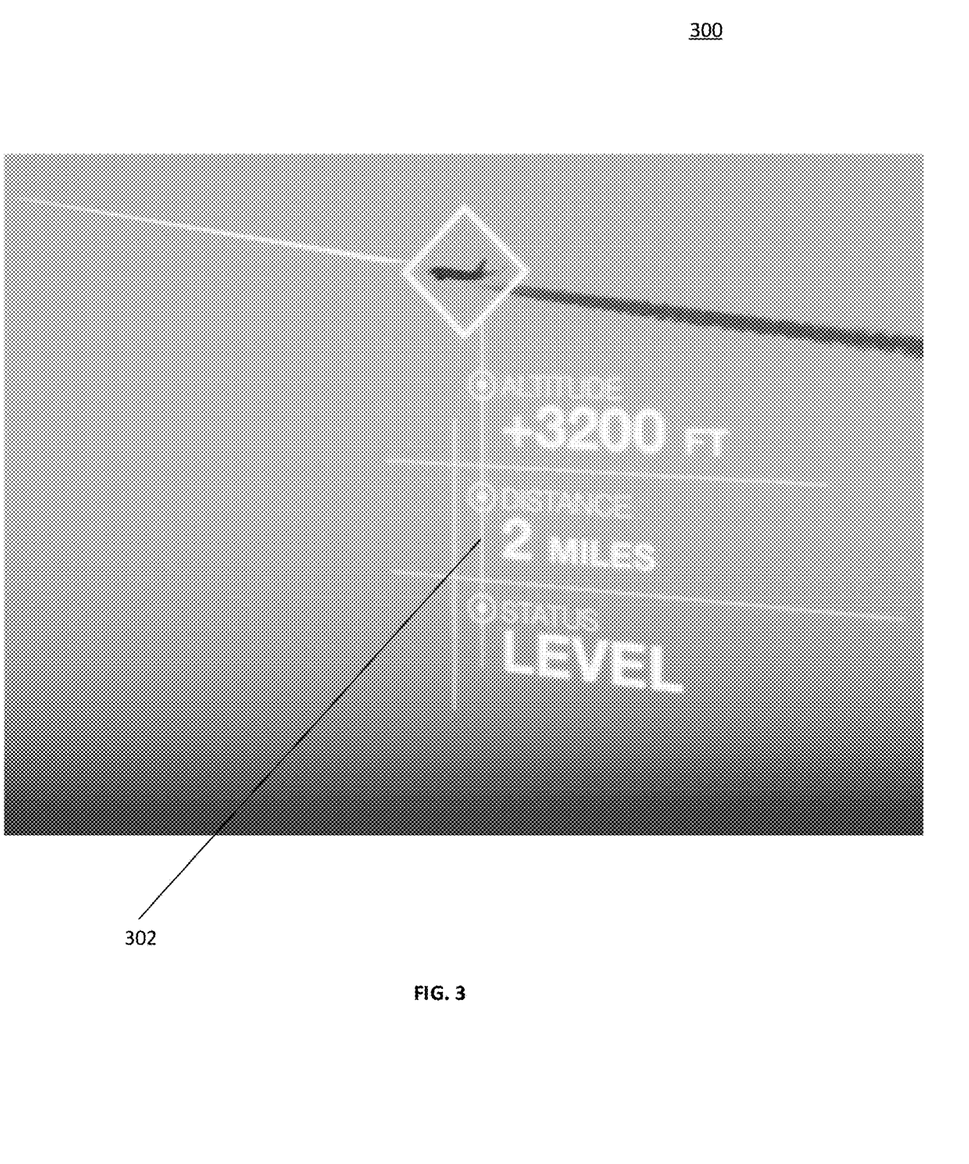
FIG. 3 is a display view of flight parameters using an ARVS according to an exemplary embodiment.
Figure 4:
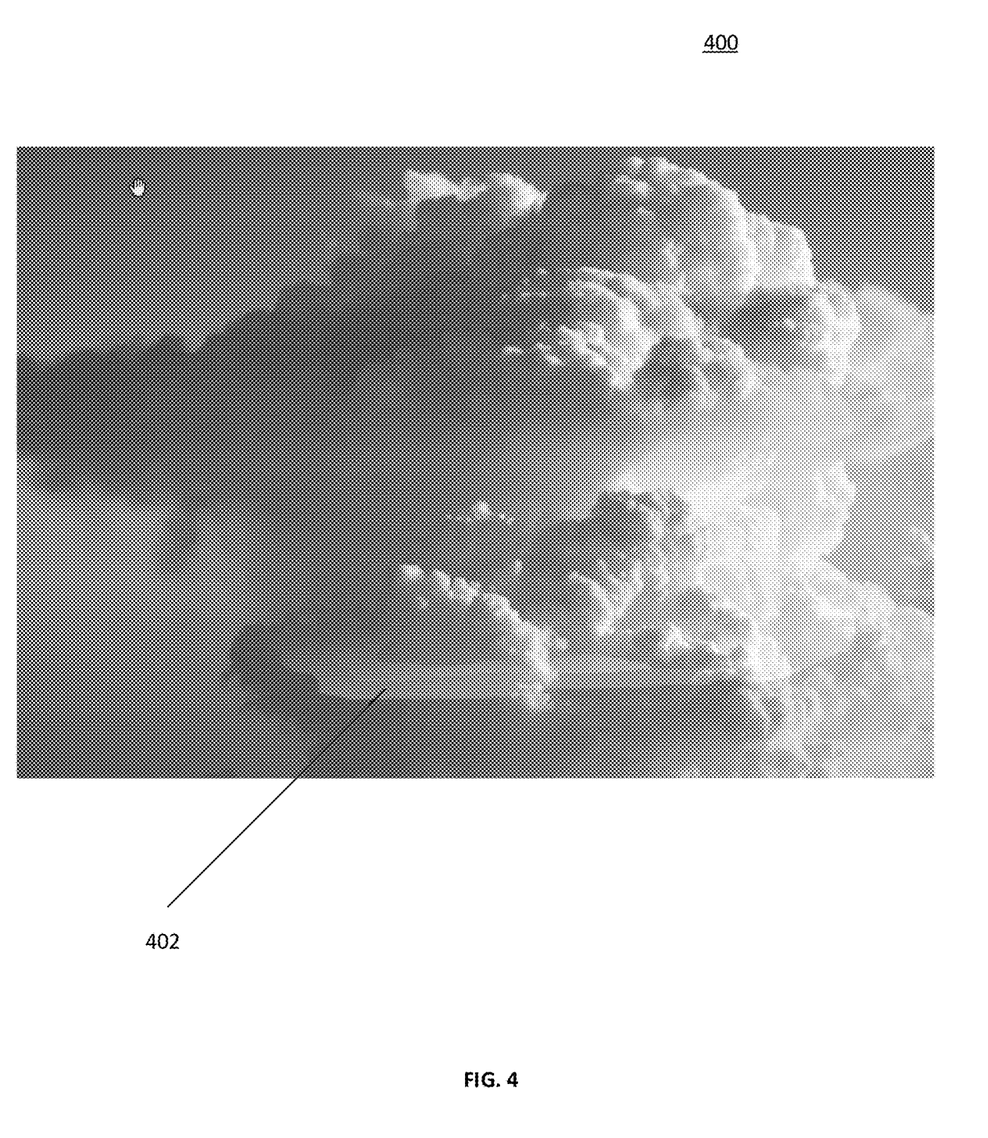
FIG. 4 is a display view of weather information using an ARVS according to an exemplary embodiment.

In typical operation, an ARVS superimposes a computer-generated digital image onto a user's external environment as viewed through a transparent display. This supplements a user's perception of the real world and can expand the display area to include a full 360-degree display. The ARVS will further provide a means to develop, communicate and implement crew actions to avoid or mitigate these perceived threats. It will reduce workload, task loading and memory retention of tasks executed during normal, off-nominal and emergency situations. Turning now to FIG. 3, an example of display view 300 of flight parameters 302 such as altitude, distance and status are shown using an ARVS. FIG. 4 shows an alternative display view 400 of a weather condition 402 using an ARVS.

The ARVS capabilities are defined and controlled by the PF and PM. The display has a field of view (FOV) that is defined by the display optics. One mechanism to clearly define the roles is to highlight a very thin border around the FOV (1 to 2 pixels wide). This border can be used as an indication of who is the PF. When one pilot wishes to transfer the controls to the other pilot, the normal verbal dialogue can be triggered through voice recognition. Alternatively, a manual transfer using a multi-modal event like a button press on the control yoke. Once the controls are transferred, the PM will assume the PF role and will have the border around his FOV and the PF roles will transfer to PM and the current border around his display FOV will be removed. This feature provides an immediate indication to both pilots of their respective operational roles.

In other embodiments, head tracking data is captured and utilized from the ARVS. This allows the pilot to use head tracked focus control to indicate which display to interact with by focusing on the display. Additionally, the pilot can enter a mode where the head tracking information can control the cursor-control device on that display. The pilot can move his head control the cursor control device (CCD) on the focused display. This action can be triggered multi-modally (e.g., button or gesture).

In other embodiments, a near-to-eye (NTE) (or "head-worn display (HWD)") display system may be used for aircraft. This system may also be used for ground vehicle vision systems, single pilot operations, unmanned aerial vehicles (UAV), helicopters, and to connect workers in a network. The NTE is typically "head worn" like a pair of googles or a visor. Examples of such embodiments include head-up displays (HUD), binoculars or a monocular device. One example of an NTE system provides a very low latency, fast refresh system and weighs less than 450 g. The system has a display operating at 50 Hz and strobed at ⅕ duty cycle. Other embodiments could operate at 420-480 Hz which would provide the necessary display stability when the system was inserted into turbulent or rough environments.

A vestibulo-ocular reflex (VOR) response is a compensatory eye movement which keeps the image fixed on the retina for any head rotations and translations. Some embodiments of an NTE ARVS system, use an algorithm to predict the eye rotational motion due to VOR effects. The architecture of the VOR eye motion model consists of the eye angular VOR (aVOR) motion prediction model based on the head tracking.

Figure 5:
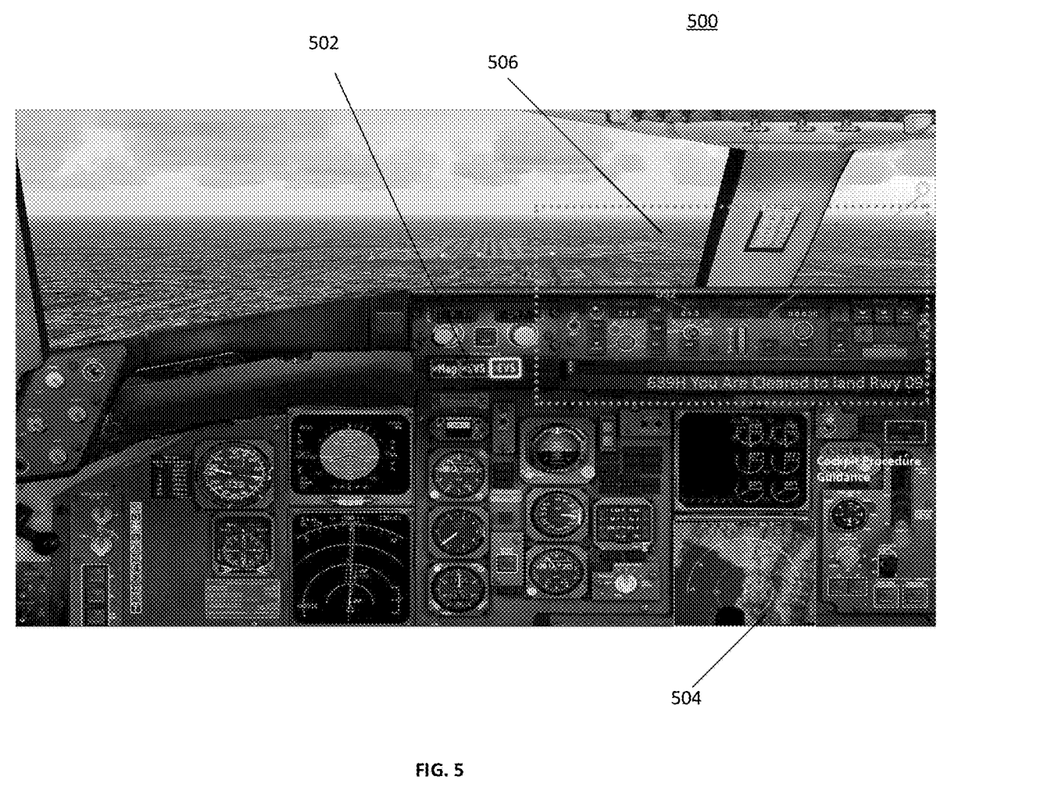
FIG. 5 is an internal cockpit view of an ARVS according to an exemplary embodiment.

A natural vision system ensure individual objects in a user's visual field are perceived depending on specific dynamic factors involving issues related to line of sight, visual acuity, the limitations of peripheral vision, expectancy, the task being performed, and the character of surrounding activity and other visual distractions. The ARVS system will provide a very natural viewing experience for the operator. The ARVS system leverages flight deck display concepts and available state-of-the-art display and crew interaction technologies to improve cockpit resource management by providing local 360° situational awareness to the vehicle operators under the expected conditions of weather, ambient light etc. For example, FIG. 5 depicts an internal cockpit view 500 of an ARVS according to an exemplary embodiment. This example includes virtual buttons 502 that are gaze controlled; an HDD 504 and a HUD display 506 for a PM.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, additional intervening elements, devices, features, or components may be present in an embodiment of the depicted subject matter.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A system for displaying flight data parameters to aircrew members of an aircraft, comprising:
   a graphics system that creates computer generated images of flight data parameters comprising,
      a context buffer, and
      a graphics processor that receives the flight data parameters from,
         flight controls,
         on board sensors,
         an on board database,
         system information and alerts generated by the systems on board the aircraft,
         a navigation system on board the aircraft,
         a communication system that receives data communications from air traffic control (ATC);
   a first display for a pilot flying (PF) with a defined field of view (FOV) for the PF that shows the computer generated images of flight data parameters that are designated for the PF;
   a second display for a pilot monitoring (PM) with a defined FOV for the PM that shows the computer generated images of flight data parameters that are designated for the PM;
   a highlighted border around the FOV of the PF in the first display which indicates that the PF is in control of the aircraft; and an augmented reality vision system (ARVS) that reassigns the displays of the designated computer generated images of flight data parameters between the first display and the second display during a transfer of control from the PF to the PM and highlights a border around the FOV of the PM in the second display to indicate that the PM has assumed control of the aircraft, where the transfer of control is triggered through voice recognition instructions by the PF or the PM.

2. The system of claim 1, where the first and second displays are near-to-eye (NTE) displays.

3. The system of claim 2, where the NTE displays are head worn goggles.

4. The system of claim 3, where the head worn goggles are a monocular device.

5. The system of claim 3, where the head worn goggles are binoculars.

6. The system of claim 3, where the head worn goggles are a head tracking device.

7. The system of claim 1, where the first and second displays are head up displays (HUD).

8. The system of claim 1, where the first and second displays are head down displays (HDD).

9. A system for displaying data parameters to crew members of a vehicle, comprising:
   a graphics system that creates computer generated images of flight data parameters comprising,
      a context buffer, and
      a graphics processor that receives the flight data parameters from,
         flight controls,
         on board sensors,
         an on board database,
         system information and alerts generated by the systems on board the aircraft,
         a navigation system on board the aircraft,
         a communication system that receives data communications from air traffic control (ATC);
   a primary display for a primary operator of the vehicle with a defined field of view (FOV) for the primary operator that shows the computer generated images of data parameters of the vehicle that are designated for the primary operator;
   a secondary display for a support crew member of the vehicle with a defined field of view (FOV) for the support crew member that shows the computer generated images of data parameters of the vehicle that are designated for the support crew member;
   a highlighted border around the FOV of the primary in the first display which indicates that the primary operator is in control of the aircraft; and
   an augmented reality vision system (ARVS) that reassigns the displays of the designated computer generated images of data parameters of the vehicle between the primary display and the secondary display during a transfer of control from the primary operator to the support crew member and highlights a border around the FOV of the support crew member in the second display to indicate that the support crew member has assumed control of the aircraft, where the transfer of control is triggered through voice recognition instructions by the primary operator or the support crew member.

10. The system of claim 9, where the vehicle is a ground vehicle.

11. The system of claim 9, where the vehicle is an unmanned aerial vehicle (UAV).

12. The system of claim 9, where the vehicle is a helicopter.

13. The system of claim 9, where the first and second displays are near-to-eye (NTE) displays.

14. The system of claim 9, where the first and second displays are head up displays (HUD).

15. The system of claim 9, where the first and second displays are head down displays (HDD).

* * * * *